United States Patent [19]

Poradowski

[11] Patent Number: 4,463,222

[45] Date of Patent: Jul. 31, 1984

[54] NOISE CANCELING TRANSMITTER

[75] Inventor: Lech M. Poradowski, Scarsdale, N.Y.

[73] Assignee: Roanwell Corporation, New York, N.Y.

[21] Appl. No.: 334,064

[22] Filed: Dec. 23, 1981

[51] Int. Cl.³ .............................................. H04M 1/19
[52] U.S. Cl. ................................ 179/121 D; 179/103; 179/179; 179/188; 381/94
[58] Field of Search ................... 179/121 D, 103, 179, 179/187, 188; 381/71, 94

[56] References Cited

U.S. PATENT DOCUMENTS 3,830,988  8/1974  Mol et al. ...................... 179/1 P X
4,288,663  9/1981  Foley .............................. 179/1 P X

FOREIGN PATENT DOCUMENTS 473515  11/1969  Switzerland ................... 179/121 D Primary Examiner—A. D. Pellinen
Assistant Examiner—J. Dwyer

[57] ABSTRACT

Noise canceling transmitter for voice communications comprising a casing having a principal surface opposed to the mouth of the user and three side surfaces facing upwardly, laterally and downwardly when the principal surface is so opposed. Noise canceling openings in the three side surfaces communicate noise to the back of a diaphragm in the transmitter microphone. Openings in the principal surface communicate both noise and the speaker's voice to the front of the diaphragm. The noise acts on both sides of the diaphragm and is thus canceled, while the voice acts only on one side of the diaphragm and vibrates it.

1 Claim, 7 Drawing Figures

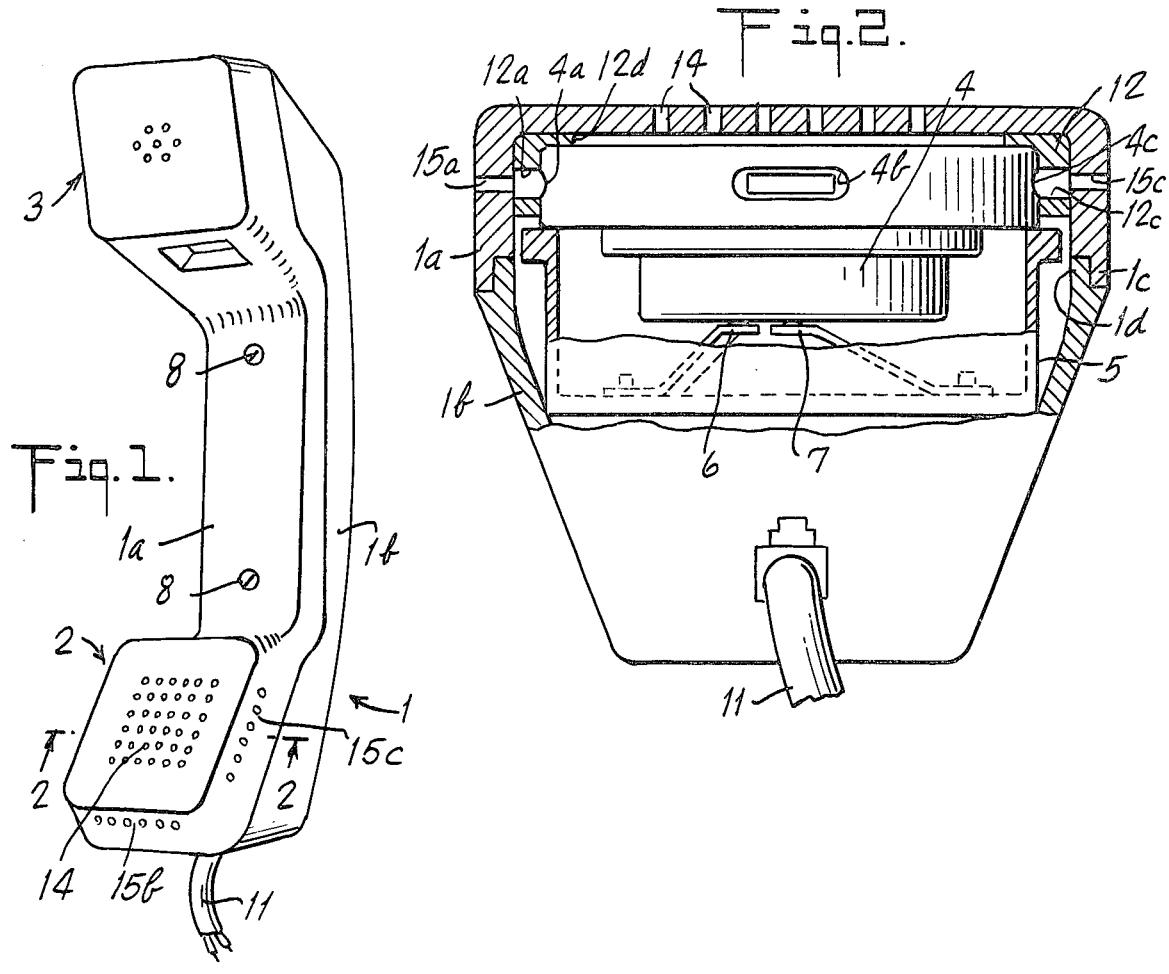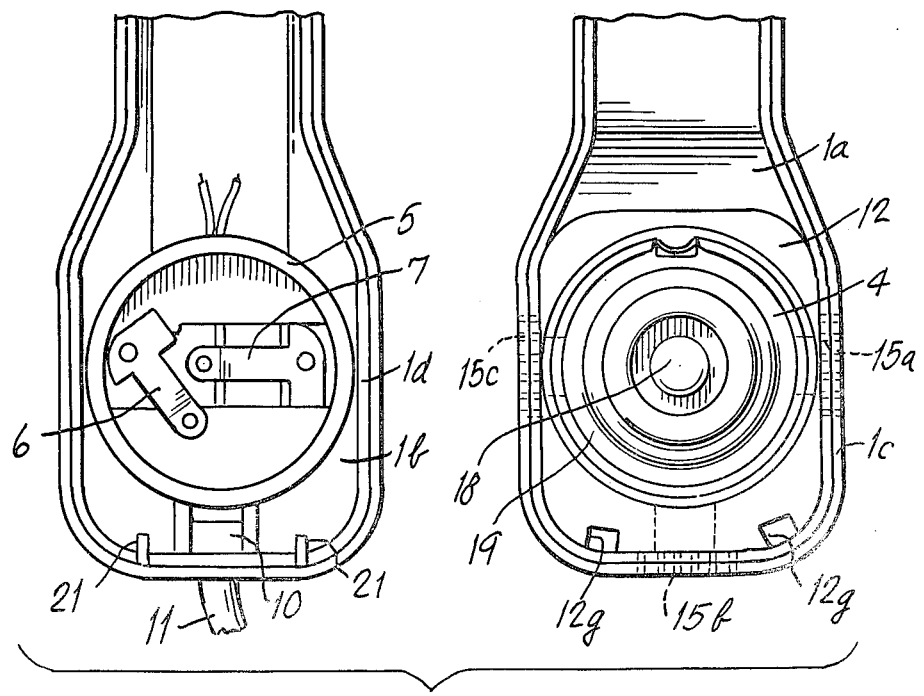

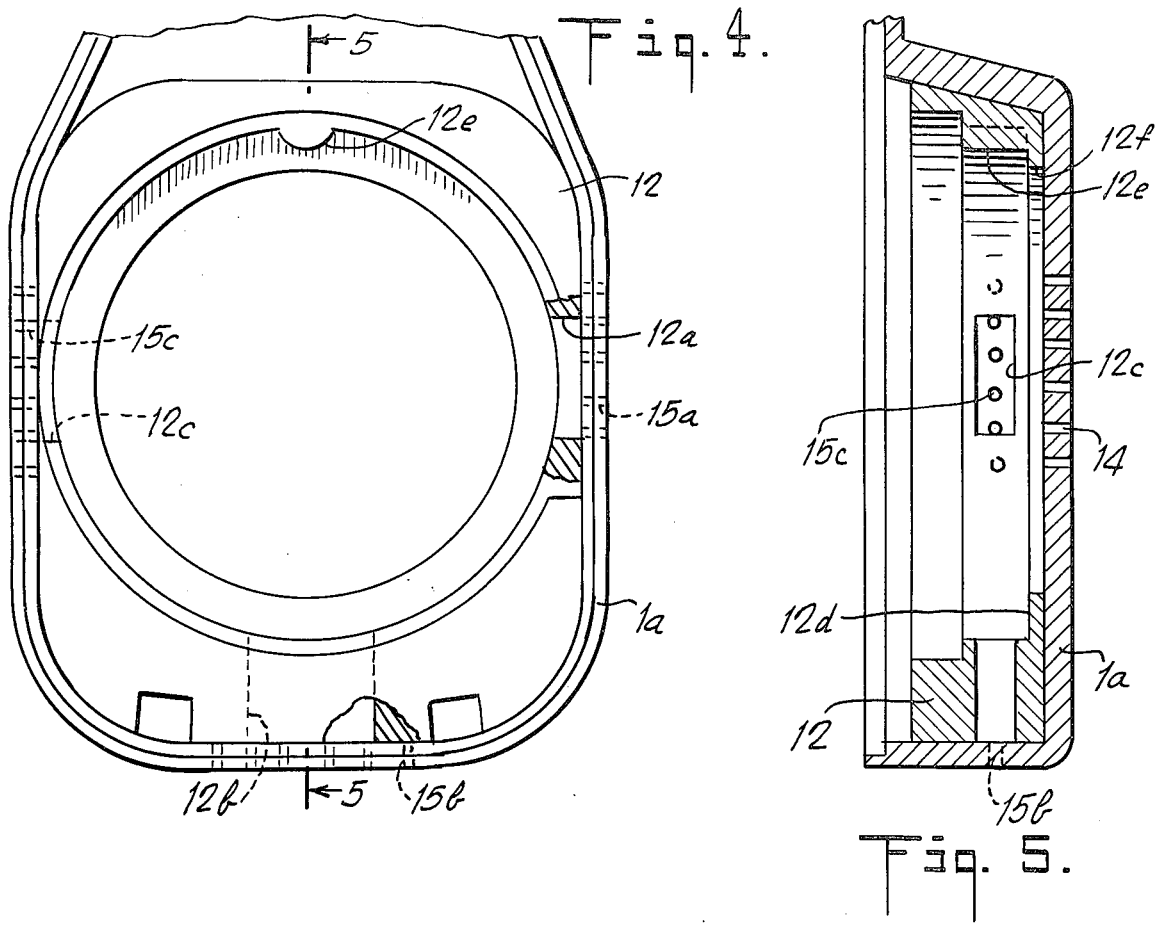
Fig. 4.
Fig. 5.
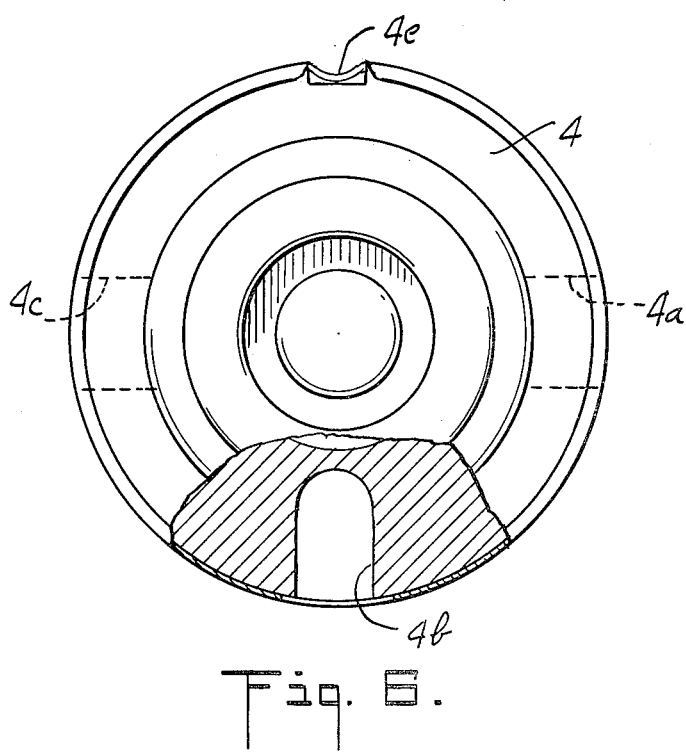
Fig. 6.
Fig. 7.

NOISE CANCELING TRANSMITTER

CROSS-REFERENCES

This invention is an improvement on the transmitters shown in the U.S. patents to Mol et al, U.S. Pat. No. 3,830,988 dated Aug. 20, 1974 and Foley, U.S. Pat. No. 4,288,663, dated Sept. 8, 1981, both of which are assigned to the assignee of the present application.

BRIEF SUMMARY

This noise canceling transmitter is shown as part of a handset including an elongated casing having at one end a primary surface located opposite the mouth of the wearer when the handset is in use and three side surfaces which face upwardly, laterally and downwardly at such times. A microphone within that end of the transmitter has a housing enclosing a diaphragm separating two chambers. One chamber receives acoustic waves through apertures in the primary surface of the transmitter and at least one aligned opening in the microphone housing. The other chamber, on the opposite side of the diaphragm, receives acoustic waves through apertures in the three side surfaces of the transmitter casing and aligned openings in the microphone housing. The transmitter cancels noise, which reaches both chambers substantially equally, but does not cancel sound coming from the direction of the mouth of the user, which reaches predominantly the one chamber. The present array of noise canceling apertures is more effective than those shown in the Mol et al. and Foley patents mentioned above. The construction shown eliminates ambient noise of about 18 db, whereas the prior art constructions eliminate a maximum of about 16 db.

DRAWINGS

FIG. 1 is a perspective view of a telephone handset embodying the invention.

FIG. 2 is a cross-sectional view taken on the line 2—2 of FIG. 1, showing the transmitter of the invention.

FIG. 3 is a fragmentary view showing the two principal parts of the transmitter end of the handset casing separated and with one part inverted, so that each part of the transmitter is shown as an elevation taken from the inside of the casing.

FIG. 4 is an elevational view, partly broken away, of a spacer nested within the transmitter end of the casing.

FIG. 5 is a cross-sectional view on the line 5—5 of FIG. 4.

FIG. 6 is an elevational view of a microphone used in the transmitter, with certain parts broken away.

FIG. 7 is a right-hand elevational view of the microphone of FIG. 6, with certain parts broken away.

DETAILED DESCRIPTION

There is shown generally at 1 a handset including a transmitter 2 and a receiver 3. The handset may include other conventional elements such as a dial or pushbutton or switch arrangements. The transmitter 2 includes a microphone generally indicated at 4 in FIGS. 2 and 3, and shown in detail in FIGS. 6 and 7.

The casing of the handset 1 comprises two interfitting parts 1a and 1b, held together by suitable means, such as two screws 8. The part 1a, nearest the user's head, has an outer flange 1c (FIGS. 2 and 3) adapted to interfit with an inner flange 1d formed on the other principal part 1b of the transmitter casing. The microphone 4 has a peripheral flange which abuts against an insulating cup 5 supporting two contacts 6 and 7, which are electrically connected through a connector 10 to a cable 11. Connector 10 includes a part fixed on the cup 5 and received in a recess on the inside of the casing part 1b, thereby fixing the position of cup 5 with respect to the casing.

The casing part 1a has a primary set of apertures 14 which are opposite the mouth of the user when the handset is in operation and three sets of secondary apertures 15a, 15b, 15c located in side faces of the same end of the casing part 1a. The apertures 15b face laterally, i.e., forwardly of the user's head, when the handset is being used. The apertures 15a and 15c face upwardly and downwardly. The particular apertures which face upwardly depends on whether the handset is used in the right or left hand.

A spacer 12 occupies the space between the casing part 1a and the microphone 4 and holds the microphone 4 in a particular orientation. The casing part 1a and the spacer 12 are asymmetrical with respect to the center of the spacer, as best seen in FIG. 5. Note that the upper wall of part 1a, as it appears in that figure, is slanted with respect to the wall with the apertures 14, while the lower wall is at right angles to the wall with the apertures 14.

The microphone 4, as best seen in FIGS. 6 and 7, includes a diaphragm 13 which separates the interior of the microphone casing into two chambers, one to the right and one to the left of the diaphragm, as they appear in FIG. 7.

The spacer 12 has three sets of openings 12a, 12b and 120c, which are aligned with the apertures 15a, 15b and 15c, respectively, and a recess 12d for receiving the microphone. Recess 12d communicates through a central opening 12f (FIG. 5) with the apertures 14.

The microphone 4 is similarly constructed with three passages 4a, 4b and 4c, which are aligned with the openings 12a, 12b, 12c and the apertures 15a, 15b, 15c respectively. The passages 4a, 4b and 4c all open into the chamber behind the diaphragm as best seen in FIGS. 6 and 7.

The inside of the transmitter end of the casing part 1a has a generally rectangular configuration, as shown in FIG. 3. This configuration is oblong, the vertical dimension as viewed in that figure being greater than the horizontal dimension. The cup 5 is located eccentrically with respect to the corresponding rectangular configuration of the other part 1b of the casing. Note that the cup 5 is somewhat above the center of the transmitter end, as it appears in the left-hand part of FIG. 3. The recess 12d is similarly off center with respect to the configuration of the spacer 12, as best seen in FIGS. 4 and 5.

The spacer 12 can be inserted in the transmitter end of the casing part 1a only in one orientation. It obviously can be inserted only with its long dimension vertical, as viewed in FIG. 3. If it is inverted from the position shown, then the slanting upper wall of the spacer 12 will not fit down into the bottom portion of the casing 1a. Furthermore, the recess 12d which receives the microphone 4 will not be aligned with the cup 5, and if the microphone is placed in the recess 12d, and an attempt is then made to connect the two parts 1a and 1b of the casing 1, there will be interference between the spacer 12 and the part 1b and also between the microphone 4 and the cup 5, and the parts cannot be assembled. The peripheral configuration of the spacer 12 ensures that it can be assembled in the casing part 1a only in the correct orientation.

The recess 12d in the spacer 12 is provided at one side with an inwardly projecting ridge 12e (FIGS. 4 and 5), which mates with a recess 4e in the microphone 4, so that the microphone can be assembled in the spacer 12 only in one orientation, i.e., with the ridge 12e fitting into the recess 4e.

Thus, the orientation of the spacer 12 with respect to the casing part 1a and the orientation of the microphone 4 with respect to the spacer 12 are fixed so that the passages 4a, 4b and 4c of the microphone are positively assured of alignment with the openings 12a, 12b, 12c and the apertures 15a, 15b, 15c, respectively.

The face of the microphone nearest the casing part 12a is provided with a central aperture 4d (FIG. 7) which is aligned with some of the apertures 14 in the casing part 1a and with a large central opening 12f in the spacer 12. Thus, the acoustic communication between the mouth of the user and the microphone is assured through the apertures 14, the opening 12f, and the central passage 4d.

The apertures 14, 15a, 15b, 15c in the casting part 1a may be misaligned with the openings 12f, 12a, 12b and 12c in the spacer and with the passages 4d, 4a, 4b, 4c in the microphone 4. This misalignment is unimportant since there are numerous apertures 14 and numerous apertures 15a, 15b and 15c. The apertures 14 and 15 are smaller than the central opening 12f and the openings 12a, 12b and 12c. Consequently, there are always several apertures 14 or 15 aligned with the openings 12f or 12a, 12b, 12c in the spacer 12. Any apertures 14 or 15 that are blocked by the spacer 12 may be nonfunctional because of that blockage, but there are always a sufficient number of unblocked apertures to provide the necessary acoustic communication.

The microphone 4 is a carbon microphone as shown in FIG. 7, being similar to that shown in the Foley U.S. Pat. No. 4,288,663, mentioned above. The passages 4a, 4b. 4c which communicate with the chamber in back of the diaphragm 13 are different from the corresponding passages in the microphone of the Foley patent.

Also, the central contacts 18, and the annular contact 19, which cooperate with the spring fingers 6 and 7 in the bottom of the cup 5, are, in the present microphone 4, both flat contacts in substantially the same plane, whereas the annular contact is tilted slightly in the Foley patent.

The casing part 1b is provided at each end with a pair of resilient fingers 21 (FIG. 3) which engage recesses (not shown) in the part 1a when the two parts are assembled. The spacer 12 is cut away, as shown at 12g in FIG. 3, so as not to interfere with the fingers 21 during assembly.

It has been found that the array of apertures 15a, 15b, 15c, leading through the passages 12a, 12b, 12c and openings 4a, 4b, 4c to the chamber behind the diaphragm 13 are more effective in canceling noise from the surroundings than are the noise canceling apertures of the prior art. Specifically, an increase from 16 db to 18 db of noise cancellation has been observed by comparisons with prior art structures.

I claim:

1. A noise-canceling transmitter for a communications handset, comprising:

a. an elongated casing having a transmitter end and a receiver end and adapted to be supported in an operating position with the transmitter end near the mouth of the user, said transmitter end being oblong and having a primary set of apertures opposite the mouth of the user when the casing is in said operating position and three secondary sets of apertures directed at angles of substantially 90° with respect to the apertures of the primary set;

b. a microphone within the transmitter end of the casing, including:
  1. housing means having a primary opening aligned with at least one aperture of the primary set and three secondary openings, each aligned with at least some apertures of one of the three secondary sets of apertures; and
  2. a diaphragm within the housing means supported at its periphery and separating first and second chambers, said first chamber receiving acoustic waves through the primary opening, and said second chamber receiving acoustic waves through the secondary openings;

c. one of said three secondary sets of apertures is directed away from the receiver end of the casing, and the other two sets of secondary apertures are each directed perpendicularly to said one set of secondary apertures and in opposite directions to each other;

d. a spacer fitting within said oblong end of the casing only in one orientation, said spacer having a recess to receive the microphone and having one primary and three secondary passages;

e. non-circular interfitting surfaces on the microphone and on the recess in the spacer, so that the microphone is receivable in the recess only in one orientation, said spacer being effective when fitted within the casing and when the microphone is received in the recess to provide acoustic communication from the primary set of apertures through the primary passage and the primary opening to the first chamber of the microphone, and also to provide acoustic communication from the three secondary sets of apertures through the secondary passages and the secondary opening to the second chamber of the microphone;

f. said transmitter end of the casing has a front wall opposite the mouth of the user when the headset is in operation, three side faces extending perpendicularly to said front wall, and a fourth side face slanted with respect to said front wall, said fourth face extending from said front wall toward the receiver end of the casing, said primary set of apertures being in said front wall, and each of said three secondary sets of apertures being located in one of said three side faces;

g. said spacer has a plane surface abutting the inside of said front wall, three side surfaces extending at right angles to said plane surface, and a fourth side surface slanted with respect to said plane surface at the same angle that said fourth face slants with respect to said front wall, said primary passage extending through said plane surface and said three secondary passages extending through said three side surfaces, so that said spacer may be received in the transmitter end of the casing only when oriented so that its fourth side surface abuts against said fourth face, said primary set of apertures is aligned with said primary passage, and said three secondary sets of apertures are aligned with said three secondary passages.

* * * * *